Figure 1:
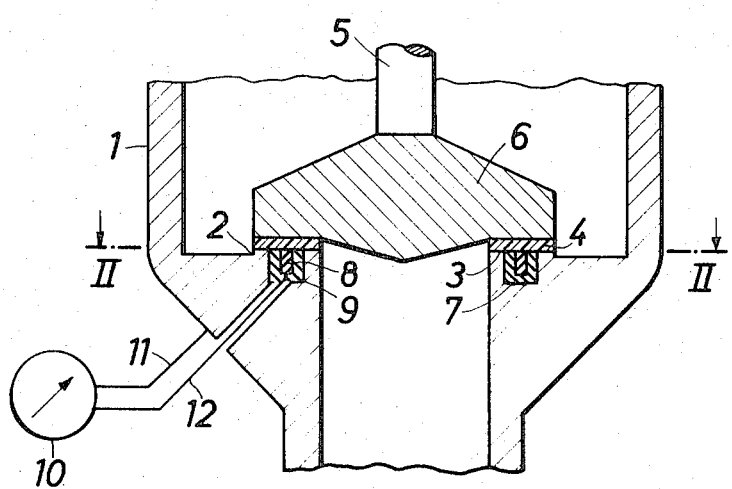

United States Patent [19]
Frolich

[11] 3,789,297
[45] Jan. 29, 1974

[54] LEAK DETECTOR

[76] Inventor: Martin Frolich, Moosstrasse 2, Gumligen, Switzerland

[22] Filed: Oct. 4, 1971

[21] Appl. No.: 186,316

[52] U.S. Cl. ............... 324/65 R, 73/46, 340/238, 340/242
[51] Int. Cl. ............................................. G01r 27/02
[58] Field of Search .... 324/65 R, 64; 340/238, 242; 73/40.5, 46

[56] References Cited
UNITED STATES PATENTS

| | | | |
|---|---|---|---|
| 2,611,643 | 9/1952 | Higgins | 324/65 R X |
| 3,382,493 | 5/1968 | Loper, Jr. et al. | 340/242 X |
| 3,383,863 | 5/1968 | Berry | 324/65 R X |
| 3,485,085 | 12/1969 | Hawkins, Jr. | 324/65 R X |
| 2,553,129 | 5/1951 | Burnett | 324/65 R X |
| 3,200,388 | 8/1965 | Uhlig | 340/242 |

Primary Examiner—Stanley T. Krawczewicz
Attorney, Agent, or Firm—Brady, O'Boyle & Gates

[57] ABSTRACT

A method of testing the fluid tightness of a sealed joint wherein a pair of electrodes are mounted adjacent the seal and are electrically insulated from each other. An indicator is connected to the electrodes which are constructed and arranged such that leakage of electrically conductive fluid through the seal will actuate the indicator.

10 Claims, 2 Drawing Figures ductive fluid bridging the electrodes due to leakage at the sealed joint, whereby leakage is detected at the joint before the leaking fluid flows therethrough.

4. A device as claimed in claim 3, wherein the device for measuring the electrical conductivity between the electrodes comprises an AC conductivity measuring device.

5. A device as claimed in claim 3, wherein the electrodes extend at the seal joint along the whole length of the seal gap.

6. A device as claimed in claim 5, wherein at least one of the electrodes defines a part of the seal face of the seal joint.

7. A device as claimed in claim 6, wherein one of the sealing faces is formed by a component comprising electrically conductive material, and the other sealing face is formed by a component of electrically insulating material, the component of electrically conductive material forming one of the electrodes and the other electrode being embedded in a recess in the seal face of the electrically insulating component.

8. A device as claimed in claim 6, wherein the electrodes are arranged off-set from one another at the seal faces.

9. A device as claimed in claim 8, in which both sealing faces are formed by components of electrically insulating material, and both electrodes being inserted in the same face.

10. A device as claimed in claim 8, in which both sealing faces are formed by components of electrically insulating material and one electrode is inserted in one face and the other electrode is inserted in the other face.

* * * * *

LEAK DETECTOR

The present invention relates to a method for testing the sealing of a seal, for example of a valve, and to a device for carrying out the method.

According to the method according to the invention, the electrical conductivity between electrodes which are mounted insulated from one another and which, in the case of a seal which is not tight, are in contact with an electrically conductive liquid is examined.

The device according to the invention for carrying out this method has two electrodes which are mounted electrically insulated from one another and which are so arranged that in the case of a seal which is not tight they are in contact with an electrically conductive liquid, and a device connected to the electrodes for checking the electrical conductivity between the electrodes.

It has been found that from the result of the checking of the conductivity it can be reliably ascertained whether the seal is satisfactorily tight. In the case of a completely tight seal, there is between the seal surfaces thereof at the most a very thin film of liquid which bridges the intermediate space between the electrodes and the conductivity of which is clearly below the conductivity which exists when liquid seeps between the seal surfaces.

Figure 2:
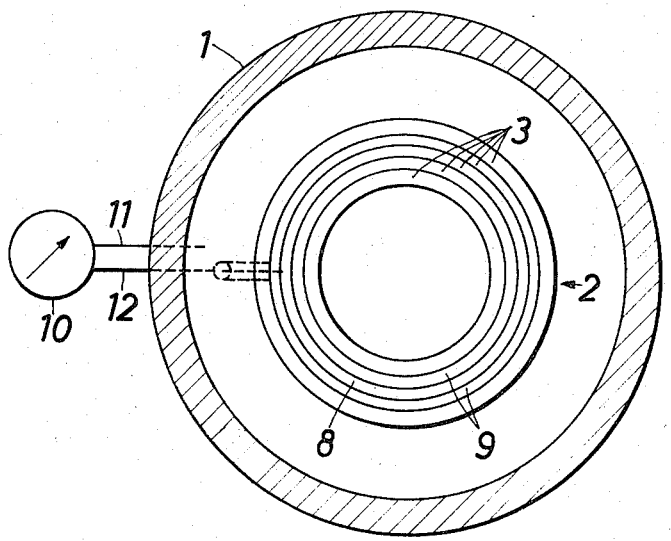

An embodiment of the device according to the invention and of the method of performing the invention, will now be described by way of example with reference to the accompanying drawings, in which:

FIG. 1 shows a schematic view of a device for examining the seal at the sealing position of a poppet valve, which is shown partly in longitudinal section; and FIG. 2 shows a section taken along the line II—II of FIG. 1.

The partly illustrated poppet valve has a housing 1 in which a valve seat 2 with a sealing surface 3 is formed. In the illustrated closed position of the valve, a seal 4 is pressed against the sealing surface 3, the seal 4 being fixedly and tightly connected to the valve disc 6 carried by the valve spindle 5. The housing 1 comprises metal and the seal 4 comprises an electrically non-conductive seal material, e.g. rubber.

In the valve seat 2 there is formed an annular groove 7. In this groove there is seated an annular electrode 8, which with the exception of its surface facing the seal 4 is embedded in a body 9 of insulating material. The surface parts of the valve seat 2 facing the seal 4 on both sides of the annular groove 7 and the surface of the insulating body 9 facing the seal 4, together with the electrode 8, lie in one plane and together form the sealing surface 3 of the valve seat. It is important that these surfaces should lie in one plane (or, if the seat is slightly conical, on the conical surface thereof) and are smooth, so that when the valve is closed there is a very thin liquid film (somewhat comparable with the lubrication film in a slide bearing), but in no case pockets of liquid, between the seal face 3 and the seal 4 when the seal 4 abuts in a liquid tight manner against the seal face 3.

A device 10 for examining the electrical AC conductivity is connected by a conductor 12, which is guided in an insulated manner in the housing 1, to the electrode 8, and by a conductor 11 to the housing 1, which serves as the second electrode. When the valve is closed and the seal face 3 is moistened with an electrically conductive liquid, the device 10 indicates the conductivity of the parts of the very thin liquid film between the sealing surface 3 and the seal 4, which bridge the front sides of the arms of the U-section insulating body 9, and thereby form an electrical connection between the electrode 8 and the parts of the valve seat 2 limiting both sides of the annular groove 7 and formed on the housing 1.

When an electrically conductive liquid, e.g. conductive water or milk in a milk plant or a cleaning liquid, adjoins the seal of the valve and the valve is not tight, so that liquid seeps at any point of the annular sealing gap between the seal face 3 and the seal 4, the device 10 indicates a considerably greater conductivity. The device 10 can be so arranged that in this case it initiates an alarm and/or a control process in the plant in which the valve is provided.

The electrodes can also be arranged at the sealing faces of the valve plate, the seal being fixedly and tightly fixed to the valve seat. In that case the electrical connection of the electrode with the conductivity checking apparatus is complicated by the movability of the valve plate. Also, both the seal between the seal and the valve seat and also between the seal and the valve plate can be supervised in the above-described manner. Moreover, a plurality of concentric annular electrodes could similarly be employed. If the housing does not comprise metal, but an insulating material, instead of the one electrode 8 two concentric electrodes could be inserted in the insulating material.

The above-described device can also be employed in other types of valve, e.g. ball valves, and is not restricted to checking the sealing between the closure member of a valve and the valve seat, but also can be correspondingly employed e.g. in lid seals, pipe flange connections, shaft end seals and slide rod seals.

In the above-described manner, the seals of sealing positions in plants and machines, for example in the chemical and food industries, e.g. in diary technology and in reaction technology, can be examined and supervised.

What I claim is:

1. A method of testing the fluid-tightness of a sealed joint comprising;
   a. providing a pair of electrodes electrically insulated from each other;
   b. mounting said insulated electrodes at the sealed joint so that they are substantially co-planar with respect to each other and the sealed joint;
   c. examining the electrical conductivity between said electrodes when in contact with an electrically conductive fluid bridging the electrodes due to leakage at the sealed joint, whereby leakage is detected at the joint before the leaking fluid flows therethrough.

2. A method as claimed in claim 1, wherein the electrical AC conductivity between the electrodes is examined.

3. A device for testing the fluid-tightness of a sealed joint comprising, a pair of electrodes mounted at the sealed joint, said electrodes being substantially co-planar with each other and the sealed joint, insulation disposed between said electrodes for electrically insulating said electrodes from each other, and a conductivity measuring device connected to said electrodes for measuring the electrical conductivity between the electrodes when they come in contact with electrically con-